(12) United States Patent
Dziulko

(10) Patent No.: US 7,004,649 B2
(45) Date of Patent: Feb. 28, 2006

(54) DEVICE INTERPOSED BETWEEN TRIPODS AND CAMERAS FOR SERIES OF PANORAMIC PHOTOGRAPHS

(76) Inventor: Adolphe Dziulko, 62/4 avenue du General de Gaells, 94170 Le Perreux (FR)

( * ) Notice: Subject to any disclaimer, the term of this patent is extended or adjusted under 35 U.S.C. 154(b) by 0 days.

(21) Appl. No.: 10/500,300

(22) PCT Filed: Dec. 30, 2002

(86) PCT No.: PCT/FR02/04584

§ 371 (c)(1),
(2), (4) Date: Jun. 28, 2004

(87) PCT Pub. No.: WO03/056388

PCT Pub. Date: Jul. 10, 2003

(65) Prior Publication Data

US 2005/0084260 A1    Apr. 21, 2005

(30) Foreign Application Priority Data

Dec. 28, 2001  (FR) .................................. 01 17061

(51) Int. Cl.
*G03B 17/00*  (2006.01)
(52) U.S. Cl. ..................................... 396/428

(58) Field of Classification Search ................ 396/419, 396/428; 348/36, 39
See application file for complete search history.

(56) References Cited

U.S. PATENT DOCUMENTS

| 2,145,584 A | * | 1/1939 | Chamberlain, Jr. | ...... 248/179.1 |
| 3,737,130 A | * | 6/1973 | Shiraishi | .................. 248/181.1 |
| 5,040,759 A |   | 8/1991 | Wainwright | |
| 5,752,113 A | * | 5/1998 | Borden | ...................... 396/428 |
| 6,701,081 B1 | * | 3/2004 | Dwyer et al. | ............... 396/329 |
| 2003/0128975 A1 | * | 7/2003 | Shevick | ..................... 396/428 |

FOREIGN PATENT DOCUMENTS

| DE | 100 04 541 | 8/2001 |
| GB | 428 003    | 5/1935 |

OTHER PUBLICATIONS manfrotto.com webpages, 303 Pan Head and 303SPH, Dec. 30, 2003 and Jan. 3, 2004.*

* cited by examiner

*Primary Examiner*—Christopher Mahoney
(74) *Attorney, Agent, or Firm*—Westerman,Hattori, Daniels & Adrian LLP

(57) ABSTRACT

The invention concerns a light metallic device interposed between tripods and cameras, placing the camera lens focus just above the axis of rotation of the stand, thereby enabling capture of successive images, for a perfect panoramic view.

13 Claims, 1 Drawing Sheet

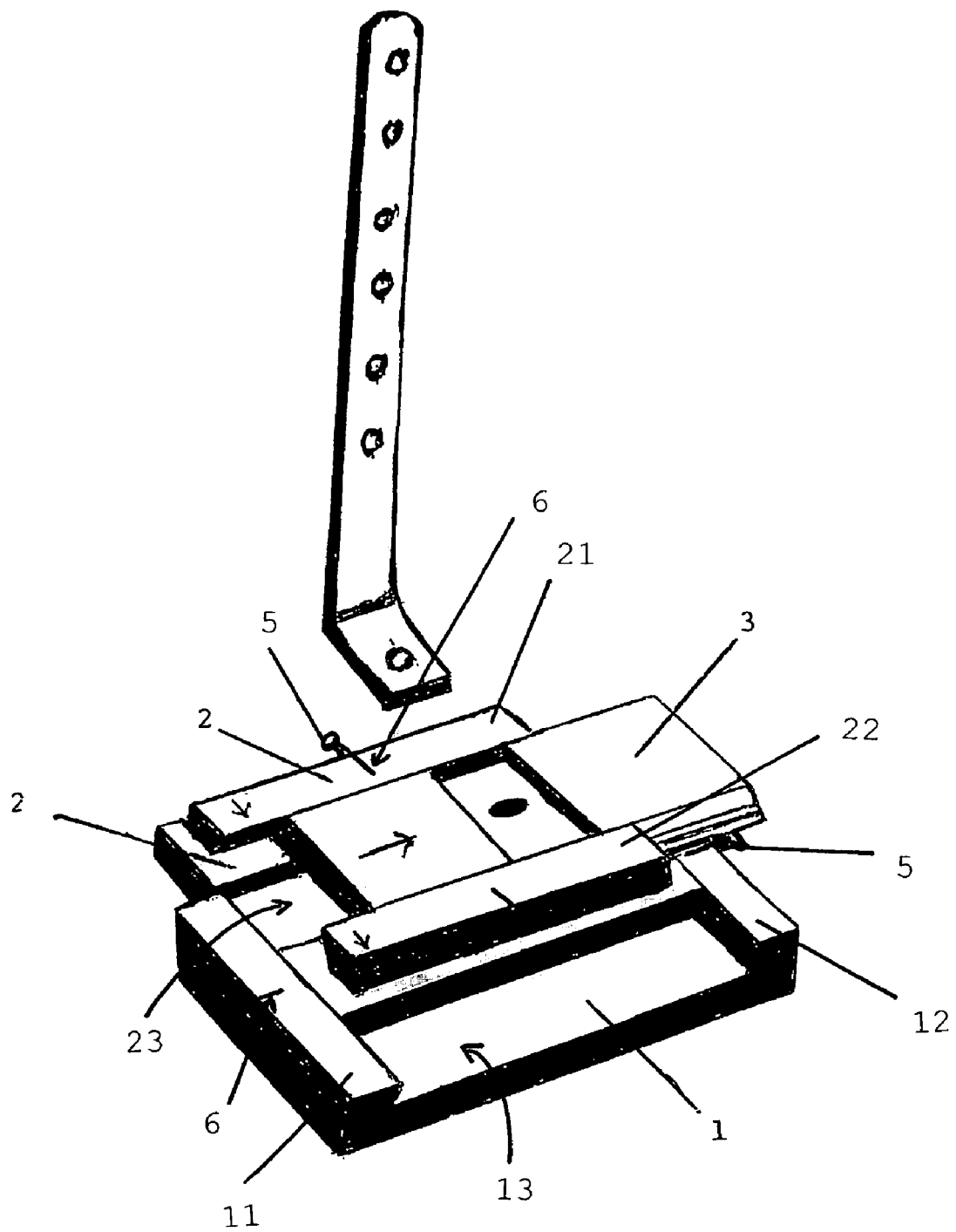

DEVICE INTERPOSED BETWEEN TRIPODS AND CAMERAS FOR SERIES OF PANORAMIC PHOTOGRAPHS

BACKGROUND OF THE INVENTION

Panoramic views have always drawn the attention of amateurs and professionals. Knowing that the field of clarity of our vision does not extend beyond the surface of a thumb nail with the arm extended, we keep browsing reality with our eyes, but we focus only on what interests us. Like reality, the final image in a panoramic assembly must have presence and a lot of clarity, the presence is provided by a normal focal distance, in the image of our vision, 35 mm for a surface of 24×36 mm.

The "panoramic" position on photographic cameras is a delusion, as it is only the reframing of a normal image.

The choice of taking a series of views, then to assemble them into a panoramic view, is a good choice, provided that a few simple but important rules are respected.

As a preliminary, it is advised to work with a stand, to keep a good horizontality, to choose a medium focal distance which is related to that of the eye and a good presence, to set the photographic camera in a vertical position as often as possible, and finally, in order to approach perfection, to take the successive views from a same rotation point located under the lens focus, between the diaphragm and the body of the camera.

Some professional tripods make it possible to do all that, but they are heavy and, above all, very expensive, others, for amateurs, probably also fulfill these conditions, but the device that I propose makes it possible to give all tripods without exception the possibility to arrive at a result verging on perfection with the lowest cost, the price of such a simple and elegant device being about 40 Euros.

SUMMARY OF THE INVENTION

The present invention provides a metallic device in light alloy, intermediate between any tripods and photographic cameras making it possible to position a crucial point of the lens, the nodal point or the focus just above the rotation point of the head of the tripod, so that the assembly including the photographic camera pivots around the focus of the lens.

Advantageously, the device is composed of three metallic plates sliding relative to each other, the first, a base part, is fixed to the head of the tripod, make it possible for the second to slide the optical axis of the lens laterally on the rotation axis of the stand, these two parts blocked, the third, carrying the photographic camera, positions the focus of the lens just above the rotation point of the head of the stand. Some marking engraved on the plates can help to accomplish these functions with a maximum of ease and efficiency.

BRIEF DESCRIPTION OF THE DRAWINGS

The FIGURE is a schematic view of a device according to the present invention.

DETAILED DESCRIPTION OF AN EMBODIMENT

The device is made up of three plates in light metal alloy, which slide relative to each other. The first plate (1) is fixed on the tripod. The second slides laterally and positions the optical axis of the lens on the rotation axis of the stand. These two operations being blocked by tightening screws, the third plate, being moved from back to front or toward the front, positions the focus of the lens above the rotation point of the stand. Once the three plates are blocked, the photographic camera pivots around the focus of its lens during the successive shots.

As shown in the FIGURE, the plates have their main planes parallel to each other. The first plate has two side rails 11, 12 mounted on the plate, forming a first groove 13 along a first direction, the first groove having a trapezoidal cross-section with the large base at the bottom of the groove. The second plate is adapted to slide in the first groove. The second plate also has two side rails 21, 22 mounted on the plate, forming a second groove 23 along a second direction transverse to the first direction, the second groove also having a trapezoidal cross-section with the large base at the bottom of the groove. The third plate is adapted to slide in the second groove. An arm 4 having a main axis perpendicular to the third plate is mounted on the third plate. A camera (not shown) can be mounted on the arm.

In the FIGURE, the tightening screws are shown by reference 5 and the markings are shown by reference 6.

What is claimed is:

1. Metallic device for use as intermediate between any stand and photographic camera, making it possible to position a crucial point of the lens, such as the nodal point or the focus, just above the rotation point of the head of the stand, so that the assembly including the photographic camera pivots around the focus of the lens,
   wherein the device comprises three plates having their main planes parallel to each other and adapted to slide relative to each other, such that:
   the first plate, a base part, is adapted to be fixed to the head of the stand,
   the second plate is adapted to slide the optical axis of the lens laterally on the rotation axis of the stand,
   these two plates being blocked, the third plate, adapted to carry the photographic camera, is adapted to position the focus of the lens just above the rotation point of the head of the stand.

2. Device according to claim 1, wherein the device is in light alloy.

3. Device according to claim 1, wherein the stand is a tripod.

4. Device according to claim 1, wherein the plates are in light alloy.

5. Device according to claim 1, wherein markings are located on the plates to help slide and position the plates.

6. Device according to claim 1, wherein the first plate has first side rails mounted on the first plate, said first side rails defining a first groove along a first direction, the second plate being adapted to slide between said first side rails.

7. Device according to claim 6, wherein the second plate has second side rails mounted on the second plate, said second side rails defining a second groove along a second direction transverse to the first direction, the third plate being adapted to slide between said second side rails.

8. Device according to claim 7, wherein the first groove has a cross-section having a shape of a trapezoid with a large base at the bottom of the groove.

9. Device according to claim 8, wherein the second groove has a cross-section having a shape of a trapezoid with a large base at the bottom of the groove.

10. Device according to claim 7, wherein the second groove has a cross-section having a shape of a trapezoid with a large base at the bottom of the groove.

11. Device according to claim 7, wherein the upper surface of the first plate forms a bottom of the first groove and an upper surface of the second plate forms a bottom of the second groove.

12. Device according to claim 6, wherein the first groove has a cross-section having a shape of a trapezoid with a large base at the bottom of the groove.

13. Device according to claim 12, wherein the second groove has a cross-section having a shape of a trapezoid with a large base at the bottom of the groove.

* * * * *